No. 884,360. PATENTED APR. 14, 1908.
F. D. BROGA.
MEAT HOOK.
APPLICATION FILED SEPT. 16, 1904.
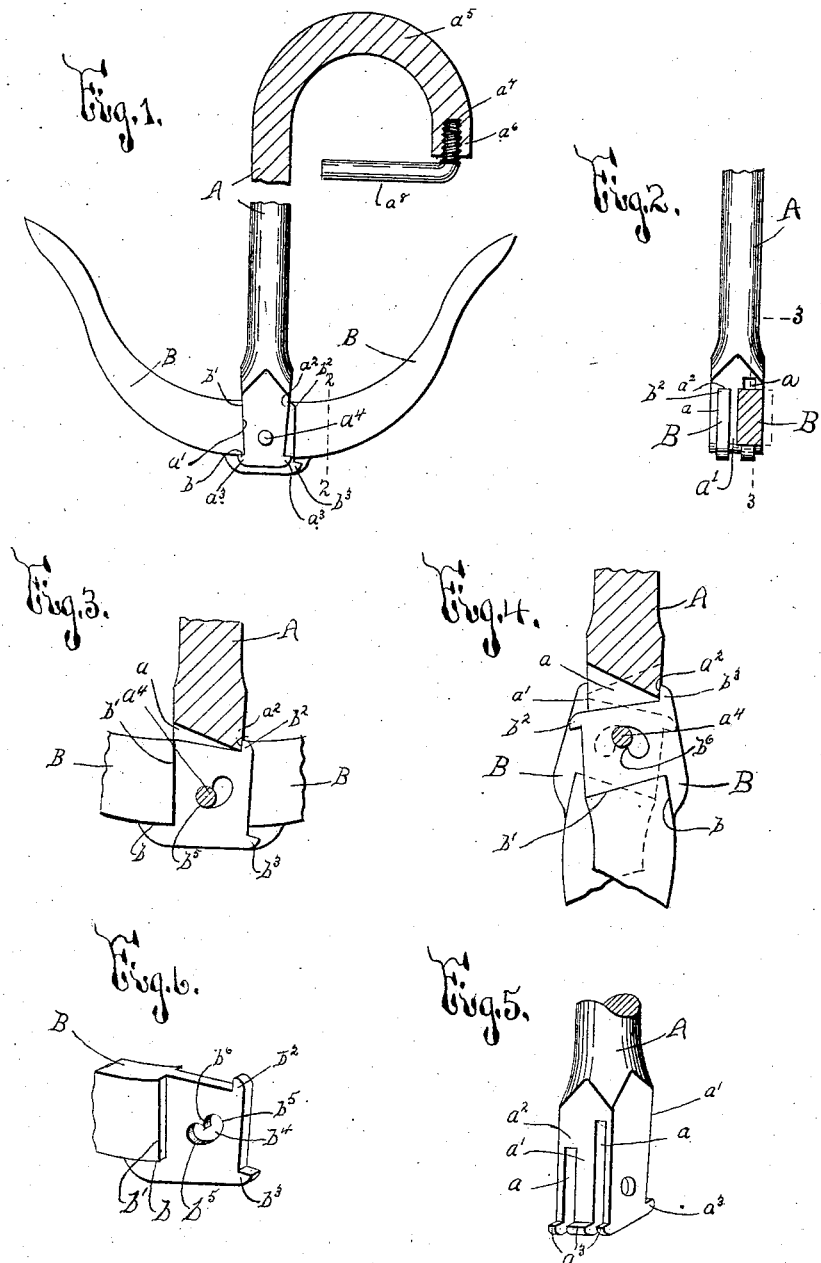
WITNESSES:
INVENTOR
Franklin D. Broga
BY
ATTORNEYS

UNITED STATES PATENT OFFICE.

FRANKLIN D. BROGA, OF ONEIDA, NEW YORK.

MEAT-HOOK.

No. 884,360. Specification of Letters Patent. Patented April 14, 1908.

Application filed September 16, 1904. Serial No. 224,698.

*To all whom it may concern:*

Be it known that I, FRANKLIN D. BROGA, of Oneida, in the county of Madison, in the State of New York, have invented a certain new and useful Meat-Hook, of which the following is a specification.

My invention has for its object the production of a hook, especially applicable for supporting meat, which is particularly simple in construction and practical in use, and permits the ready disengagement of the quarter, or other piece, of meat and its inclosing wrapper engaged with said hook; and to this end, it consists in the combination, construction and arrangement of the component parts of a hook, as hereinafter fully set forth and pointed out in the claims.

In describing this invention, reference is had to the accompanying drawing forming part of this specification, in which like characters designate corresponding parts in all the views.

Figure 1 is a side elevation, partly in section, of one construction of my hook, its hook-members being shown in operative position. Fig. 2 is a vertical sectional view on line 2—2, Fig. 1. Fig. 3 is a vertical sectional view on line 3—3, Fig. 2, the free ends of the hook-members being broken away.
Fig. 4 is a view, similar to Fig. 3, of the parts seen in said Fig. 3, the hook-members being illustrated in their inoperative positions. Figs. 5 and 6 are isometric views of the adjacent ends of the shank and one of the hook-members of my invention.

This hook consists, essentially, of a shank A and opposite hook-members B.

The shank A is of any desirable form, size and construction, its upper portion being provided with means suitably formed for engaging any desired support, not illustrated, and its lower portion being provided with substantially parallel slots $a$ extending upwardly from the lower edge or surface of the shank through opposite faces $a'$ thereof, and having their upper walls preferably extended downwardly from one face $a'$ toward the other face $a'$, as best seen in Figs. 3 and 4. Said lower portion of the shank A is also provided with engaging surfaces $a^2$ above the ends of the slots $a$, shoulders $a^3$ projecting outwardly from the lower ends of the faces $a'$, and a fixed pivot $a^4$ connecting the side walls of the slots $a$ and arranged between the faces $a'$ below the engaging surfaces $a^2$.

In the preferable construction of my invention, the upper portion of the shank A is provided with a lateral extension $a^5$ having a depending end $a^6$ formed with a threaded socket $a^7$ extending upwardly from its lower surface, and is also provided with an engaging member $a^8$ having angularly arranged arms, one being threaded and movable in the socket $a^7$, and the other being adapted to engage the lower surface of the support for the hook.

The hook-members B project outwardly from the shank A, are provided with fixed engaging surfaces $b$ and shoulders $b'$, and when in their operative position preferably extend upwardly in opposite directions from their contiguous ends, which are reduced in thickness, are movable in substantially vertical planes in the slots $a$ of the shank A, are pivoted to the lower portion of the shank A by the pivot $a^4$, and are provided with fixed shoulders $b^2$ $b^3$ and a slot $b^4$. Said hook-members may assume an inoperative position with their outer or free ends in planes substantially beneath the lower surface of the shank A, or an operative position with said ends in upper planes at an angle to the shank, and are movable on the pivot $a^4$ as their outer or free ends move from one position to the other. The surfaces $b$ and the shoulders $b'$ $b^2$ respectively engage the upper faces of the shoulders $a^3$ below and at opposite sides of the pivot $a^4$, the opposite edges of the side walls of the slots $a$, and the surfaces $a^2$ above and at opposite sides of the pivot $a^4$, and hold the hook-members firmly in their operative position; and the shoulders $b^3$ engage said surfaces $a^2$ above and at opposite sides of the pivot $a^4$ and limit the downward movement of the hook-members from their operative position. The slots $b^4$ receive the pivot $a^4$, their opposite ends being formed with substantially semi-circular bearing faces $b^5$ and their intermediate portions being formed of a width greater than the diameter of the pivot $a^4$ and provided with shoulders $b^6$ which project inwardly from their upper walls between the opposing bearing faces $b^5$, and are formed with comparatively narrow or sharp inner edges and opposite sides diverging from said edges, these slots $b^4$ being thus substantially kidney-shaped in form.

When the hook-members are in either their operative or inoperative positions, the pivot $a^4$ is engaged by corresponding substantially semi-circular bearing faces of the slots $b^4$, parts of said faces being provided on the shoulders $b^6$ which then tend to prevent endwise movement of the hook-members and facilitate the rocking movement thereof. As the hook-members are rocked to their operative position, the shoulders $b^6$ with their comparatively narrow or sharp inner edges engage upper portions of the pivot $a^4$ and afford an insufficient bearing for supporting the hook-members between their operative or inoperative positions, and thus compel said hook-members to move to either of said positions and avoid any possibility of the hook-members being apparently locked, or not rocked completely to their operative positions. Moreover, when the free ends of the hook-members are elevated slightly to disengage the surfaces $b$ and the shoulders $b^2$ from operative engagement with the shank A, thus sliding the upper ends of the shoulders $b'$ along the opposing surfaces of the shank, said shoulders $b^6$ ride upon the pivot $a^4$ and accelerate the disengagement of the shoulders $b^2$ from the faces $a^2$, thereby facilitating the downward movement of the free ends of the hook-members from their operative position.

Although the illustrated embodiment of my invention is provided with two hook-members, it is apparent that one of said members may be dispensed with if desired.

The construction and operation of my hook, will now be readily understood upon reference to the foregoing description and the accompanying drawing, and it will be apparent that more or less change may be made in the construction and arrangement of the component parts thereof, without departing from the spirit of my invention.

Having thus fully described my invention, what I claim as new and desire to secure by Letters Patent, is:—

1. A hook comprising two elements, one a shank, and the other a hook-member pivoted to the shank and movable on its pivot relatively thereto, one of said elements being provided with a pivot, and the other with a slot for receiving the pivot, the element formed with the slot being provided with means coacting with the pivot of the other element for forcing the hook-member into and out of its normal or operative position, and for preventing the hook-member from assuming a position intermediate of its normal and extreme abnormal positions, substantially as and for the purpose described.

2. A hook comprising two elements, one a shank, and the other a hook-member, one of said elements having means for normally engaging the other for holding the hook-member in operative position and one of said elements being provided with a pivot fixed thereto, and the other being provided with a slot receiving the pivot, said slot having opposing bearing faces for respectively coacting with the pivot when the hook-member is in its operative and inoperative positions, and the element provided with the slot having a shoulder projecting into the slot between said bearing faces for engaging the pivot and forcing the hook-member into its operative and inoperative positions, substantially as and for the purpose described.

3. A hook comprising two elements, one a shank, and the other a hook-member, one of said elements having means for normally engaging the other for holding the hook-member in operative position and one of said elements being provided with a pivot fixed thereto, and the other being provided with a slot receiving the pivot, said slot having opposing bearing faces for respectively coacting with the pivot when the hook-member is in its operative and inoperative positions, and the element provided with the slot having a shoulder projecting into the slot between said bearing faces, opposite sides of the shoulder diverging from the free end thereof for engaging the pivot and forcing the hook-member into its operative and inoperative positions, substantially as and for the purpose set forth.

4. A hook comprising two elements, one a shank, and the other a hook-member, one of said elements having means for normally engaging the other for holding the hook-member in operative position and one of said elements being provided with a pivot fixed thereto, and the other being provided with a substantially kidney-shaped slot receiving the pivot, opposite ends of the slot forming bearings respectively for the pivot when said hook-member is in its operative and inoperative positions, substantially as and for the purpose specified.

5. A hook comprising a shank, and a hook-member pivoted to the shank, one of said elements having means for normally engaging the other for holding the hook-member in operative position and said hook-member having a projecting free end movable downwardly as the hook-member swings on its pivot out of operative position, said hook-member being provided with a slot receiving the pivot therefor, said slot having its opposite ends formed with substantially semi-circular bearing faces and its intermediate portion formed of a width greater than the diameter of the pivot and provided with a shoulder projecting inwardly from its upper wall and engaging the pivot for facilitating the movement of the hook-member from its operative position, substantially as and for the purpose set forth.

6. A hook comprising a shank, and a hook-member pivoted to the shank and having a projecting free end movable downwardly from its operative position, said hook-member being provided with means engaging the shank for preventing downward movement of the free end of the hook-member, and with additional means having sliding contact with the shank for facilitating the movement of the former means from its operative position upon upward movement of the free end of the hook-member, and said hook-member being also provided with a slot receiving the pivot therefor, and with a shoulder projecting inwardly from the upper wall of the slot and engaging the pivot for facilitating the movement of the hook-member from its operative position, substantially as and for the purpose described.

7. A hook comprising a shank, and a hook-member pivoted to the shank, one of said elements having means for normally engaging the other for holding the hook-member in operative position said hook-member having a projecting free end movable downwardly as the hook-member swings on its pivot out of operative position, and said hook-member being provided with means for engaging the shank and limiting the further downward movement of the free end of the hook-member when said hook-member has reached its inoperative position, and with a slot receiving the pivot for the hook-member, and with means coacting with the pivot for facilitating the movement of the hook-member from its operative position, substantially as and for the purpose specified.

8. A hook comprising a shank, and a hook-member pivoted to the shank and having a projecting free end movable downwardly as the hook-member swings on its pivot out of its normal position, said hook-member being provided with a shoulder normally arranged below and at the rear of the pivot connecting the shank and hook-member for engaging the shank above and at one side of the pivot and thereby limiting further pivotal movement of the hook-member when the hook-member has reached its lowest position, substantially as and for the purpose set forth.

9. A hook comprising a shank provided with a slot extending upwardly from the lower surface thereof through opposite faces of the shank, and with a shoulder projecting outwardly from one of said opposite faces, and a hook-member movable in the slot and pivoted to the shank, and having a projecting free end movable downwardly as the hook-member swings on its pivot out of operative position, said hook-member being provided with a plurality of means fixed thereto and respectively engaging the upper face of said shoulder and the surface of the shank for preventing downward movement of the free end of the hook-member when in operative position, and for limiting such downward movement when the hook-member moves from operative position, and said hook-member being also provided with a slot receiving the pivot, and with means coacting with the pivot for facilitating the support of the hook-member in its operative position and the movement of the hook-member from said position, substantially as and for the purpose described.

10. A hook comprising a shank provided with a plurality of slots, and hook-members movable in the slots and pivoted to the shank and having projecting free ends movable downwardly as the hook-members swing on their pivot from operative position, said hook-members being provided with means for engaging the shank and preventing downward movement of the free ends of the hook-members, and being also provided with slots receiving the pivot for the hook-members, and with shoulders projecting inwardly from the upper walls of the slots and engaging the pivot for facilitating the movement of the hook-members from their operative position, substantially as and for the purpose set forth.

In testimony whereof, I have hereunto signed my name in the presence of two attesting witnesses, at Syracuse, in the county of Onondaga, in the State of New York, this 8th day of September, 1904.

FRANKLIN D. BROGA.

Witnesses:
D. LAVINE,
E. SEEMILLER.